(12) United States Patent
Song

(10) Patent No.: US 7,715,561 B2
(45) Date of Patent: May 11, 2010

(54) SYSTEM FOR PROTECTING PERSONAL INFORMATION OF A CUSTOMER WHEN RECEIVING ON-LINE SERVICES FROM A SERVICE PROVIDER

(75) Inventor: Seung Min Song, Seoul (KR)

(73) Assignee: Bridgetec Co., Ltd., Seoul (KR)

( * ) Notice: Subject to any disclaimer, the term of this patent is extended or adjusted under 35 U.S.C. 154(b) by 1194 days.

(21) Appl. No.: 11/292,487

(22) Filed: Dec. 2, 2005

(65) Prior Publication Data
US 2006/0133597 A1 Jun. 22, 2006

(30) Foreign Application Priority Data
Dec. 8, 2004 (KR) ...................... 10-2004-0103246

(51) Int. Cl.
*H04L 9/00* (2006.01)
(52) U.S. Cl. ........................................ 380/252; 380/42
(58) Field of Classification Search .......... 380/252–254
See application file for complete search history.

(56) References Cited

U.S. PATENT DOCUMENTS 7,558,389 B2 * 7/2009 DeSimone .................. 380/275

FOREIGN PATENT DOCUMENTS

KR 1998019308 * 5/1998

* cited by examiner

*Primary Examiner*—Nasser Moazzami
*Assistant Examiner*—Lisa Lewis
(74) *Attorney, Agent, or Firm*—LRK Patent Law Firm

(57) ABSTRACT

Disclosed is an information protection system of an on-line service provider connected with customers' telephones through a telephone network for protecting important personal information of the customers from being leaked by tapping the customers' telephone lines, which includes an IVR system for collecting the customers' information-input patterns based on the customers' information-input signals received from the telephones and transmitting colored signals similar to the customers' information-input signals through the telephone network to the customers' telephone lines, and a control device for generating respective the colored signals similar to the customers' information-input signals based on the customers' information-input patterns, the colored signals being delivered to the IVR system. The IVR system transmits the colored signal to the customer's telephone line to scramble the customer's personal information being inputted. An echo canceller is provided to recover the customers' personal information from the scrambled information. An information-input pattern analyzer is provided to analyze the information-input pattern data to determine the customers' respective mean information-input patterns.

6 Claims, 5 Drawing Sheets

SYSTEM FOR PROTECTING PERSONAL INFORMATION OF A CUSTOMER WHEN RECEIVING ON-LINE SERVICES FROM A SERVICE PROVIDER

BACKGROUND OF THE INVENTION

1. Field of the Invention

The present invention relates to an information protection system of an on-line service provider connected with customers' telephones through a telephone network, which provides a means for scrambling DTMF (Dial Tone Multiple Frequency) signals inputted by the customers so as to protect the important personal information of the customers from being leaked by tapping the customers telephone lines.

2. Description of the Related Art

DTMF tones are generated when pushing the keypad buttons of a touch-tone type telephone. DTMF is based on an international convention of technological standard. The keypad or dial pad of a telephone consists of 16 digit buttons indicating respectively ten numerals of 0 to 9 and other symbols of *, #, A, B, C, D, among which the symbols A, B, C, D do not usually appear in the commonly used telephone. The digits represent respectively certain composite frequencies each composed of one of the low frequencies of 697, 770, 852 and 941 Hz and one of the high frequencies of 1209, 1336, 1477 and 1633 Hz. For example, pushing the button indicating number 1 generates a mixed frequency composed of a low frequency 697 Hz and a high frequency 1209 Hz, which frequency is recognized by the switchboard as number 1.

Referring to FIG. 1 for illustrating a conventional interactive voice response (IVR) system, a customer contacts the IVR system 30 by a telephone 10 connected to a telephone network in order to receive on-line services. In this case, he must input citizen's registered number, bank account number, credit card number, various identification numbers, bank account secret number, on-line banking secret number, security card secret number, OPT secret number, and registered electronic key by generating DTMF signals through the telephone keypad. However, the conventional IVR system has an inherent drawback that the customer's private telephone line may be secretly tapped by another person to intercept the DTMF signals. The tapped DTMF signals are transmitted through an RF transceiver 91, 92 to be recorded by a recorder. The recorded DTMF signals are then analyzed by using a spectrum analyzer 93 to discover the values of the DTMF tones. Thus, the intercepted personal information may cause a great damage to the customer.

SUMMARY OF THE INVENTION

It is an object of the present invention to provide an information protection system of an on-line service provider connected with customers' telephones through a telephone network for protecting the important personal information of the customers from being leaked by tapping the customers' telephone lines.

According to an embodiment of the present invention, there is provided an information protection system of an on-line service provider connected with customers' telephones through a telephone network for protecting important personal information of the customers from being leaked by tapping the customers' telephone lines, which comprises an interactive voice response (IVR) system for collecting the customers' information-input patterns based on the customers' information-input signals received from the telephones and transmitting colored signals similar to the customers' information-input signals through the telephone network to the customers' telephone lines, and a control device for generating respective the colored signals similar to the customers' information-input signals based on the customers' information-input patterns, the colored signals being delivered to the IVR system.

The IVR system further comprises a voice signal transmitter for transmitting the colored signals through the a telephone network to the customers' telephone lines, a voice signal receiver for receiving the customers' information-input signals generated by the telephones, an echo canceller for extracting the customers' information-input signals from the output data of the voice signal receiver, an information-input pattern collector for collecting the customers' information-input patterns, a data receiving and decoding device for receiving and decoding encoded colored signals inputted from the control device, and a main processor for controlling the voice signal transmitter, voice signal receiver, echo canceller, information-input pattern collector and data receiving and decoding device.

The control device further comprises a data receiver for receiving the customers' information-input pattern data from the IVR, an information-input pattern analyzer for analyzing the information-input pattern data to determine the customers' respective mean information-input patterns, a colored signal generator for generating and storing the customers' colored signals based on the mean information-input patterns, a data encoder for encoding the colored signals, a scheduler for determining the time and period fitting to deliver the encoded colored signals, and a data delivering part for delivering the encoded colored signals to the IVR in response to the output of the scheduler.

Preferably, the information-input pattern collector distinguishes the customers' information-input patterns by detecting tone duration indicating the time taken for each customer's pushing a telephone keypad button, pause-between-tone indicating the interval between successive pushes of buttons, or the strength of a received signal.

The personal information includes citizen's registered number, bank account number, credit card number, various identification numbers, bank account secret number, on-line banking secret number, security card secret number, OTP (One Time Password), and registered electronic key.

According to another embodiment of the present invention, there is provided an information protection method of an on-line service provider connected with customers' telephone through a telephone network for protecting the important personal information of the customers from being leaked by tapping the customers' telephone lines, which comprises the steps of storing the colored signals, searching the stored colored signals to retrieve the colored signal representing a customer presently using the on-line service, transmitting the colored signal of the customer to the customer's telephone line, requesting the customer to input his personal information to mix with the colored signal, the step of transmitting the colored signal being continued until completing the information input, receiving the mixed signal of the customer's information signal and the colored signal, and extracting the customer's information signal from the mixed signal.

It is preferable that the information protection method includes the further steps of collecting and storing the customers' information-input patterns based on the customers' information-input signals received from the telephone, and generating respective colored signals similar to the customers' information-input signals based on the customers' information-input patterns, and storing the colored signals.

It is preferable that the information protection method includes the further steps of determining the customers' respective mean information-input patterns by analyzing the information-input pattern data, and generating and storing the customers' respective colored signals based on the mean information-input patterns.

Preferably, the personal information includes citizen's registered number, bank account number, credit card number, various identification numbers, bank account secret number, on-line banking secret number, security card secret number, OTP, and registered electronic key.

The step of extracting the customer's information signal is achieved by echo cancellation.

The mean information-input patterns preferably include tone duration indicating the time taken for a customer's pushing a telephone keypad button, pause-between-tone indicating the interval between successive pushes of buttons, and the strength of a received signal.

The present invention will now be described more specifically with reference to the drawings attached only by way of example.

BRIEF DESCRIPTION OF THE ATTACHED DRAWINGS

DETAILED DESCRIPTION OF THE PREFERRED EMBODIMENTS

In the description, it is noted that the term "colored signal" is a signal that is generated by the inventive information protection system to be similar to a customer's information signal, and supplied to the customer's telephone line to mix with the customer's information signal during the customer's inputting his personal information so that the information gained by tapping the customer's telephone line can not be intelligible. Also noted is the term "echo", which means returning of the colored signal transmitted from the IVR system to the customer's telephone line. Hence, the echo canceller is a device for eliminating the echoed colored signal from the mixed signal received by the IVR system.

Figure 1:
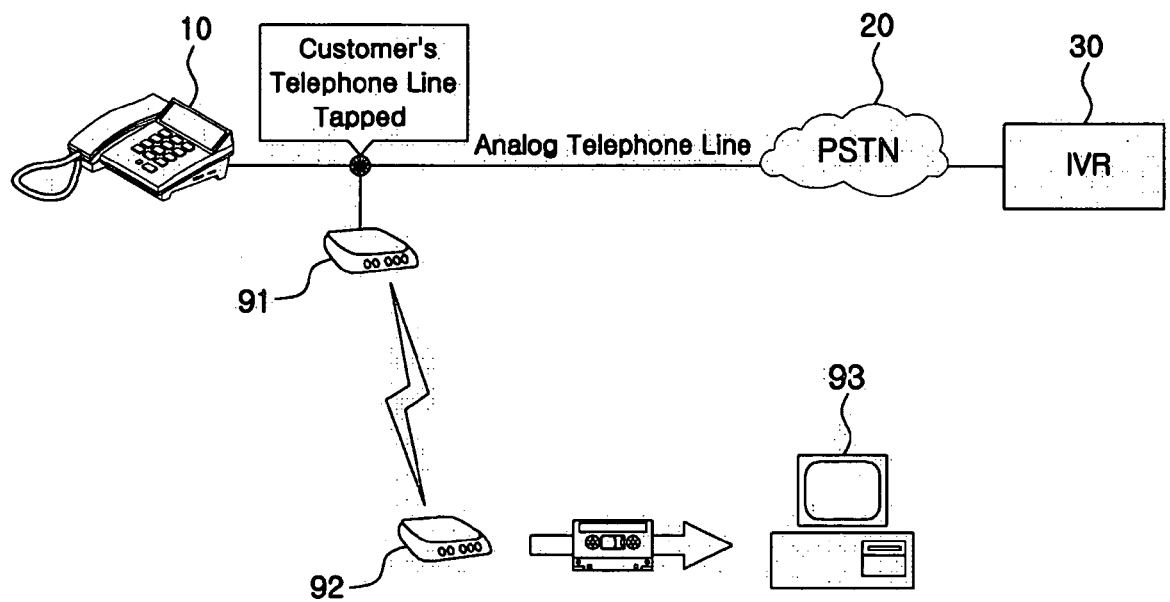
FIG. 1 is a schematic diagram for illustrating a conventional IVR system.
Figure 2:
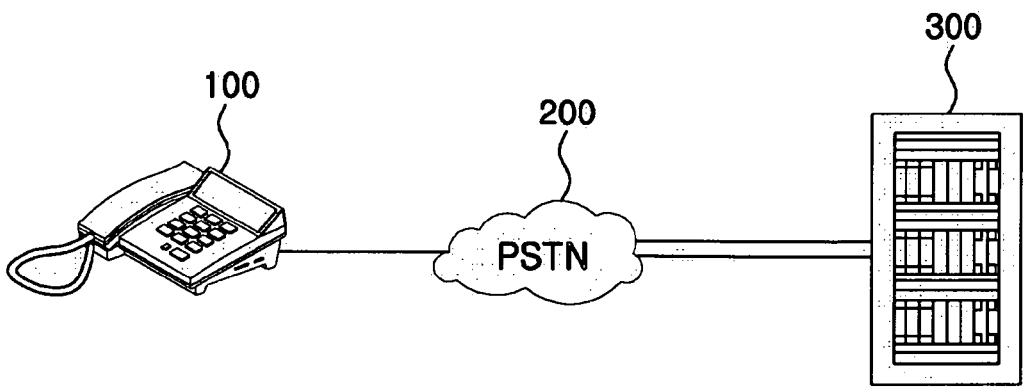
FIG. 2 is a schematic diagram for illustrating the inventive information protection system of an on-line service provider connected with customers' telephones through a telephone network.
Figure 3:
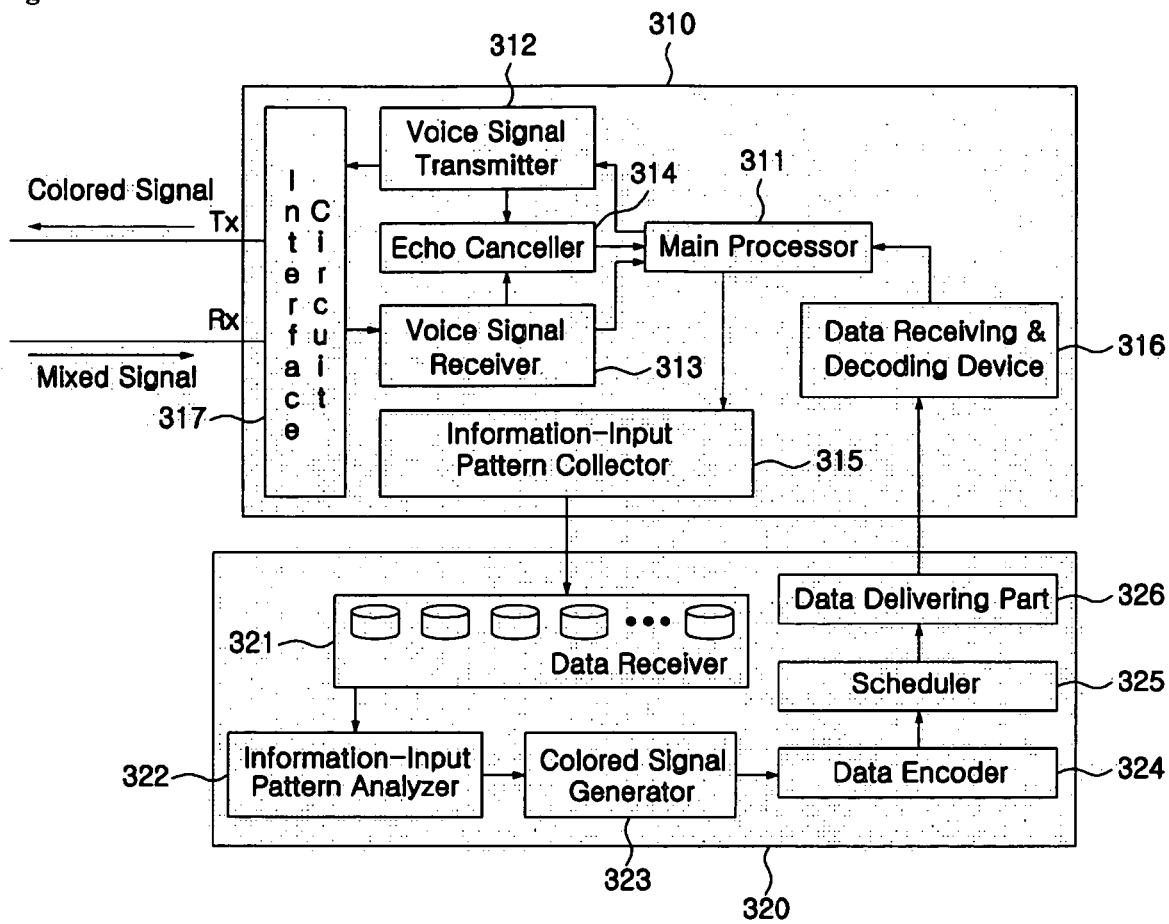
FIG. 3 is a block diagram for illustrating the construction of an information protection system according to an embodiment of the present invention.

Referring to FIG. 3, an information protection system 300 according to an embodiment of the present invention includes an IVR system 310 and a control device 320. The control device 320 may be connected with a plurality of IVR systems 310. The IVR system 310 further includes a main processor 311, voice signal transmitter 312, voice signal receiver 313, echo canceller 314, information-input pattern collector 315, data receiving and decoding device 316, and interface circuit 317. The control device 320 includes a data receiver 321, information-input pattern analyzer 322, colored signal generator 323, data encoder 324, scheduler 325, and data delivering part 326.

The voice signal transmitter 312 transmits a service scenario voice file through a telephone network to the customer's telephone under the control of the main processor 311, which voice file contains a menu and service content, and at this time also is transmitted the corresponding colored signal to the telephone.

The voice signal receiver 313 receives all the information inputted by the customer, transferring it to the main processor 311. The voice signal receiver 313 receives both voice signals and DTMF signals, but during the input of the customer's personal information the DTMF signals have priority to be received.

The echo canceller 314 eliminates from the signal received by the voice signal receiver 313 the colored signal supplied by the IVR system 310. In this case, all the signals transmitted through the voice signal transmitter 312 to a telephone network 200 are returned to the echo canceller 314. Namely, the customer's personal information and the colored signal mixed therewith are all transferred to the echo canceller 314. Thus eliminating the colored signal from the mixed signal received by the voice signal receiver 313, there remains the customer's personal information transferred to the main processor 311.

The information-input pattern collector 315 obtains the information-input pattern data representing the characteristics of the customer's personal information outputted through the echo canceller 314, which include the tone duration between the beginning and the ending of a DTMF tone and the pause between tones. The information-input pattern data of the customers are distinguished by the telephone numbers, delivered to the control device 320.

The data receiving and decoding device 316 receives and decodes the encoded colored signal from the control device 320. The interface circuit 317 interfaces the IVR system 310 with a telephone network. Controlling the voice signal transmitter 312, the voice signal receiver 313, the echo canceller 314, information-input pattern collector 315, and the data receiving and decoding device 316, the main processor 311 especially identifies the customer connected through a telephone network by the customer's telephone number, and retrieves the customer's colored signal transmitted through the voice signal transmitter 312 immediately before he inputs the personal information.

The data receiver 321 organizes the customers' information-input patterns collected through a single or multiple IVR systems into a database. The information-input pattern analyzer 322 analyzes a group of the customer's information-input patterns stored in the data receiver 321 to calculate the customer's mean information-input pattern with the most recent information-input pattern considered mainly.

The colored signal generator 323 generates the corresponding colored signal transmitted through the voice signal transmitter 312 according to the customer's mean information-input pattern. The colored signal may be a pure DTMF tone or a mixture of a musical sound and a DTMF tone.

The colored signal of the colored signal generator 323 is encoded by the data encoder 324, delivered to the IVR system 310. The scheduler 325 determines the time and period fitting for the control device 320 to deliver the colored signal to the IVR system 310. The data delivering part 326 delivers the encoded colored signal to the IVR system 310 in response to the output of the scheduler 325.

Figure 4:
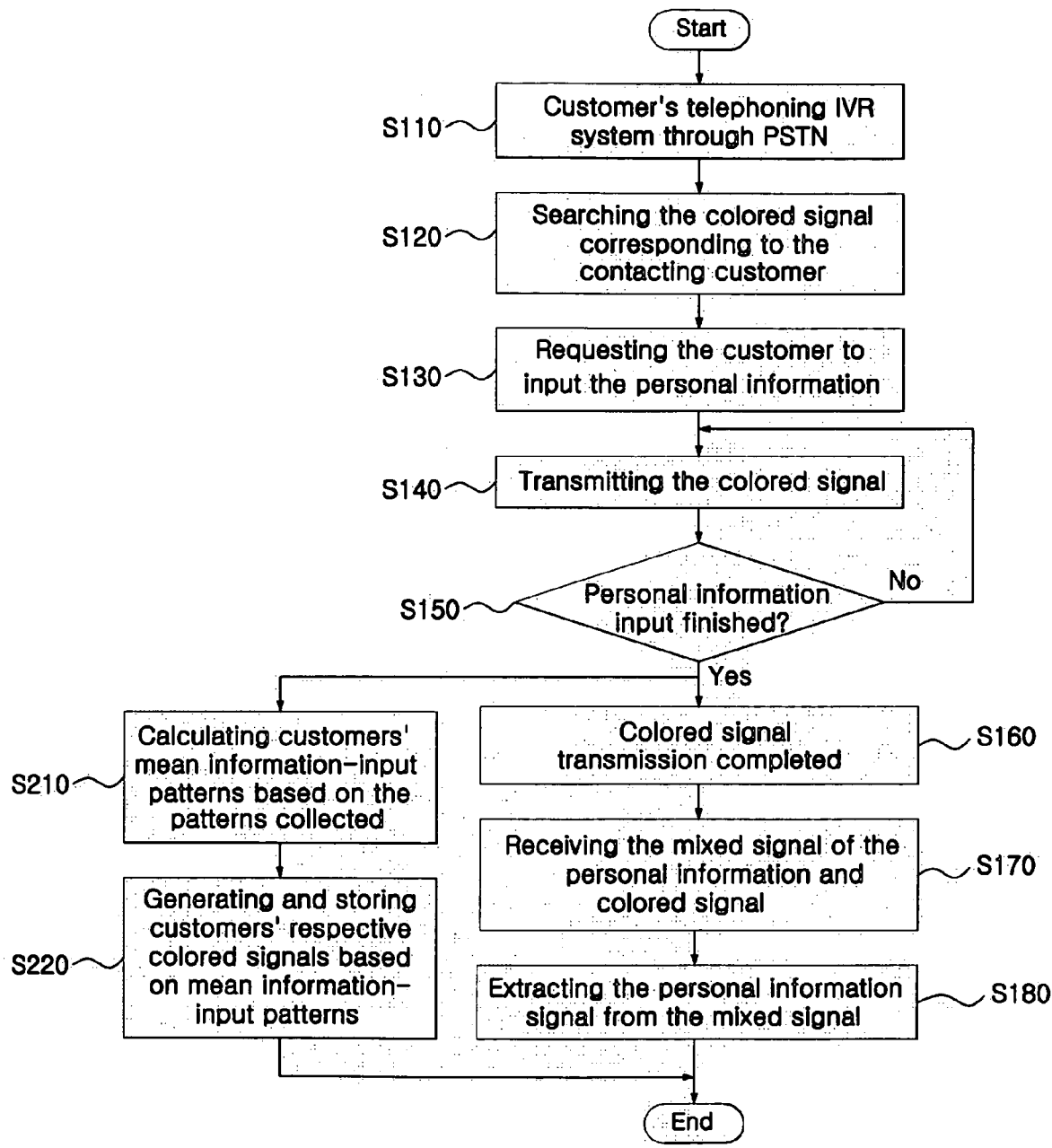
FIG. 4 is a flow chart for illustrating the signal flow of an information protection method according to an embodiment of the present invention.

Describing the operation of the inventive information protection system with reference to FIG. 4, at first the customer telephones the information protection system through a telephone network at step S110, and then the information protection system retrieves the colored signal corresponding to the customer at step S120, requests him to input his personal information at step S130, and begins to transmit at step S140 the colored signal through a telephone network to the customer's telephone line before starting the input of the personal information and continues the transmission until the information input has been checked as finished at step S160.

Then, at step S170 the information protection system receives a mixed signal composed of the personal information signal and colored signal to extract the personal information signal at step S180. The personal information includes citizen's registered number, bank account number, credit card number, various identification numbers, bank account secret number, on-line banking secret number, security card secret number, OTP (One Time Password), and registered electronic key.

When the customer has finished the input of his personal information, the information protection system calculates at step S210 the customer's mean information-input pattern based on the customer's information-input patterns stored. The customer's mean information-input pattern is used at step S220 to generate the colored signal of the customer stored.

Hereinafter, the information protection method according to an embodiment of the present invention is described, divided into three parts of generating the colored signal, transmitting the colored signal, and recovering the customer's personal information.

Generating the Colored Signal

When a customer does financial transactions by telephoning the IVR system 310, he must input the personal information such as bank account number and password. At this time the IVR system 310 collects the customer's information-input pattern that is the manner in which he inputs his personal information. For example, the citizen's registered number is usually memorized, thus being inputted quickly without an error, while the information such as a password is inputted slowly with a confirmatory act. The information-input pattern not only varies with the kind of the information, but also with the age of the customer. Based on this information-input pattern is generated a corresponding colored signal $f_{(1)}$ transmitted through the IVR system.

The values of the information-input patterns differ from each other according to the customers, and therefore the IVR 310 must also supply different colored signals $f_{(1)}$. To this end, the information-input patterns of the customers are organized into a database, based on which a colored signal $f_{(1)}$ similar to each customer's information-input pattern is generated so that the mixed signal $f_{(3)}$ intercepted cannot be analyzed by the interceptor to distinguish the customer's personal information.

The specific examples of the information-input pattern include tone duration indicating the time taken for a customer's pushing a telephone keypad button, pause-between-tone indicating the interval between successive pushes of buttons, and the strength of a received signal. The collection of a customer's information-input pattern is not accomplished by once, but in order to update the customer's information-input pattern is performed whenever the customer inputs his personal information by contacting the IVR system.

The information-input pattern collector 315 of the IVR 310 distinguishes each customer's information-input pattern data according to his telephone number, transferred to the control device 320. The data receiver 321 of the control device 320 organizes the customer's information-input data into a database.

The information-input pattern analyzer 322 analyzes the information-input patterns of a customer stored in the data receiver 321 to retrieve the information-input pattern most similar to the most recent one, which is employed by the colored signal generator 323 to generate a corresponding colored signal encoded by the data encoder 324. Then the scheduler 325 determines the time and period fitting to deliver the encoded colored signal through the data delivering part 326 to the IVR system 310, where the data receiving and decoding device 316 decodes the encoded colored signal, transmitting it by the main processor 311 through the voice signal transmitter 312 to a telephone network 200.

Transmitting the Colored Signal

The IVR system 310 has a service representative telephone number to enable a customer to receive an on-line service from the service provider at any place connected with a telephone network. The IVR system 310 is connected through a digital line T1 or E1 to a telephone network 200, which is divided into transmitting and receiving parts consisting of four wires connecting the IVR system 310 and a telephone network 200. The two of the four wires are respectively used for the IVR system 310 to receive the customer's voice signal and personal information data while the other two for the IVR 310 to transmit the service's voice signal and information data to the customer.

In order to receive an on-line service, when a customer telephones the IVR system of an on-line service provider, the IVR system first provides a ready-made voice menu for the customer to select a service by pushing DTMF tone buttons. In addition, the IVR system requires the customer to input identifying information such as the citizen's registered number, bank account number, membership number, password and security card number by pushing the DTMF buttons.

Figure 5:
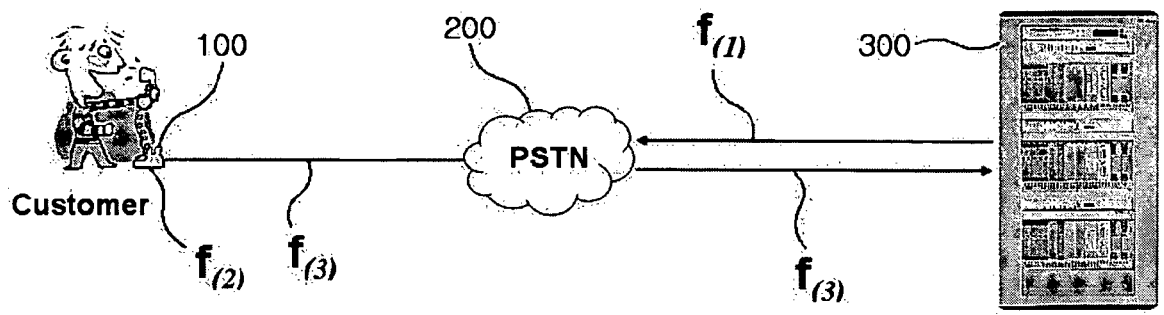
FIG. 5 is a schematic diagram for illustrating the process of inputting the customer's personal information and transmitting the corresponding colored signal according to the present invention.
Figure 6:
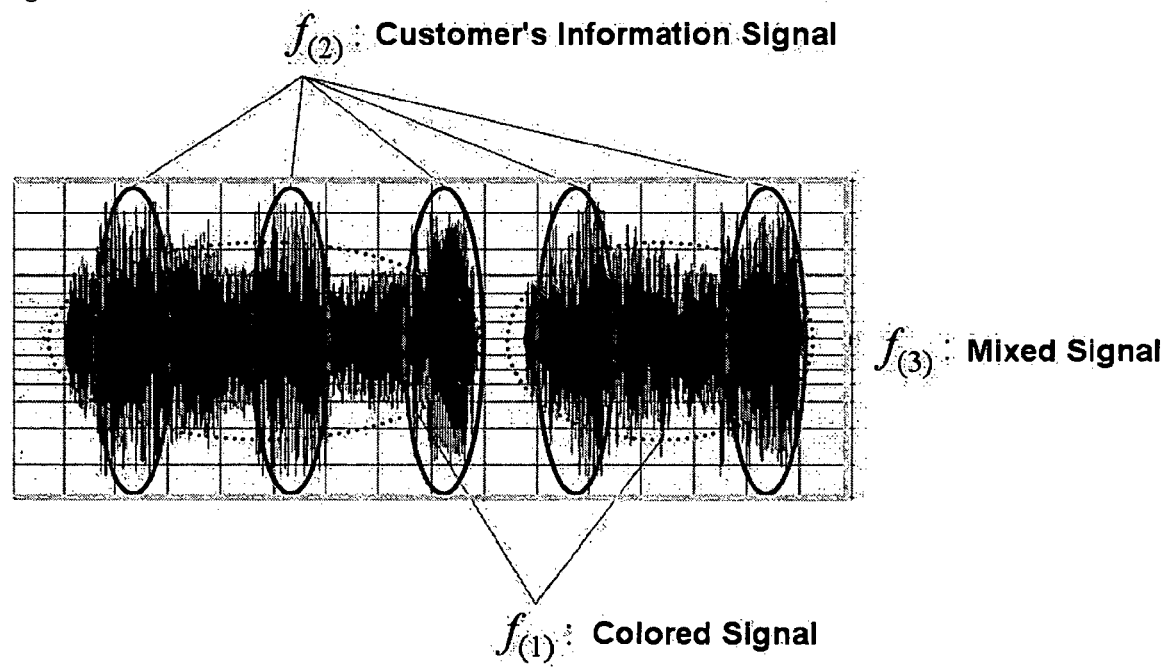
FIG. 6 is a graph for illustrating the waveform of a mixed signal $f_{(3)}$ composed of a colored signal $f_{(1)}$ and a customer information signal $f_{(2)}$.

While the customer inputs the personal information by the personal information, the IVR system 310 also transmits the corresponding colored signal through a telephone network 200, as shown in FIG. 5. The colored signal is selected from those stored in the IVR system 310, representing the customer presently contacting through a telephone network. Referring to FIG. 5, the customer's personal information is represented by $f_{(2)}$, the colored signal by $f_{(1)}$, and the mixed signal by $f_{(3)}$. Thus, if the line of the customer's telephone is tapped, there is intercepted the mixed signal $f_{(3)}$ of the colored signal $f_{(1)}$ and the customer's personal information signal $f_{(2)}$ that is unintelligible. FIG. 6 illustrates the waveforms of the colored signal $f_{(1)}$, customer's information signal $f_{(2)}$ and the mixed signal $f_{(3)}$.

Extracting the Customer's Information Signal from the Mixed Signal

As described above, transmitting the colored signal through a telephone network 200 results in the mixed signal of the colored signal and the customer's personal information signal existing in the line between the customer's telephone 100 and a telephone network 200.

Figure 7:
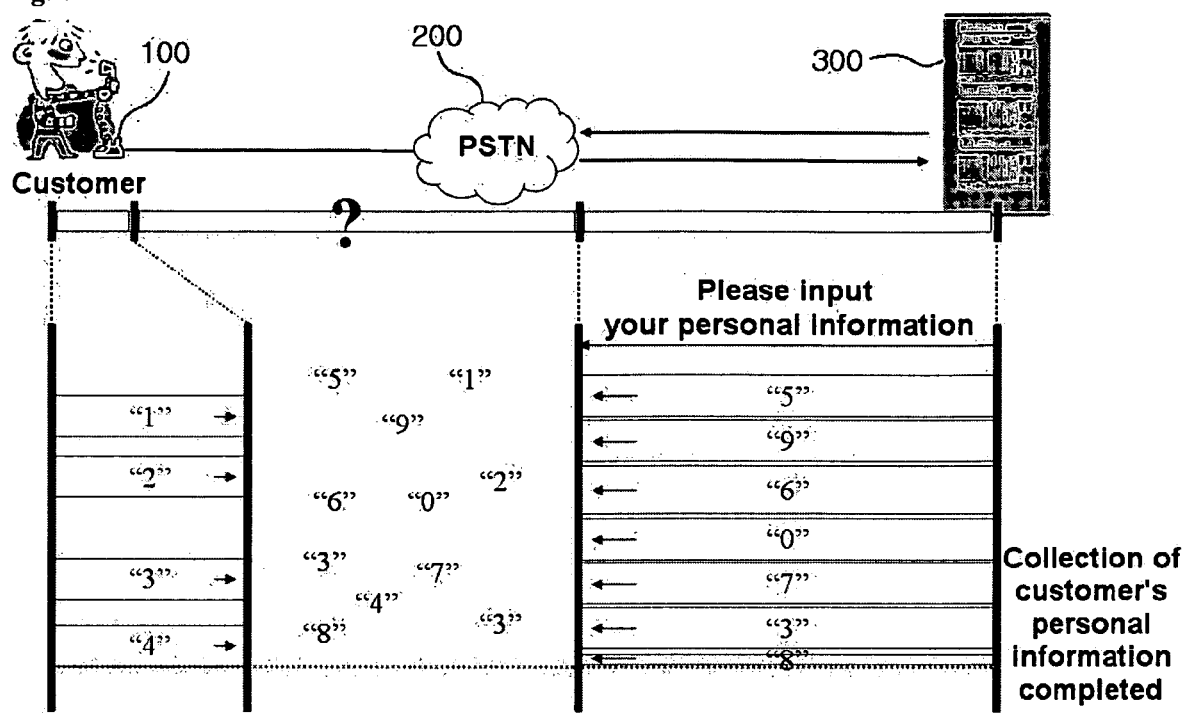
FIG. 7 is a schematic diagram for illustrating the signal flow between a customer's telephone and an information protection system according to the present invention.

Referring to FIG. 7 for illustrating the form of the mixed signal of the colored signal and the customer's information signal existing in the customer's telephone line, the customer's telephone generates the personal information signal consisting of 1, 2, 3 and 4, which is mixed with the colored signal consisting of DTMF tones 5, 9, 6, 0, 7, 3 and 8 so as to produce the mixed DTMF tone signal consisting of 1, 5, 9, 6, 0, 2, 3, 7, 4, 3 and 8 in the telephone line between the customer's telephone 100 and a telephone network 200 that is unintelligible.

Hence, the IVR system 310 must recover the customer's personal information from the mixed signal coming through a telephone network. To this end, the IVR system 310 employs the echo cancellation technology to extract the customer's personal information form the mixed signal. The echo cancellation technology employs G.168 technology established as standard by ITU-T (International Telecommunications Union-Telecommunication Standardization Sector). The echo canceller 314 of the IVR system 310 performs echo cancellation to eliminate the colored signal transmitted by the voice signal transmitter 312 from the mixed signal received through the voice signal receiver 313, thus recovering the customer's pure personal information transferred to the main processor 311. Referring to FIG. 5, the IVR system 310 of the information protection system 300 transmits the colored signal $f_{(1)}$, and then performs echo cancellation to recover the customer's personal information signal $f_{(2)}$ of 1, 2, 3 and 4 from the mixed signal $f_{(3)}$ of the colored signal $f_{(1)}$ and the customer's personal information signal $f_{(2)}$ that is received.

Although the information protection system according to the embodiment described above comprises separate IVR system and control device, it will be readily appreciated by those skilled in this art that the IVR system can be designed to include all the elements of the control device. According to the present invention, even an on-line guide employed by an on-line service provider cannot catch the personal information of a customer because the colored signal scrambles the personal information during its input.

While the present invention has been described in connection with specific embodiments accompanied by the attached drawings, it will be readily apparent to those skilled in the art that various changes and modifications may be made thereto without departing the gist of the present invention.

What is claimed is:

1. An information protection method of an on-line service provider connected with customers' telephone through a telephone network for protecting personal information of the customers from being leaked by tapping the customers' telephone lines, comprising the steps, using an interactive voice response system, of using an information protection system which includes an interactive voice response system (IVR) to:

search stored colored signals to retrieve the colored signal representing a customer presently using the on-line service;

transmit the colored signal of the customer to the customers' telephone line;

request the customer to input his personal information via telephone keypad button to mix with the colored signal, the step of transmitting the colored signal being continued until completing the information input;

receive the mixed signal of the customer's information signal and the colored signal; and extract the customer's information signal from the mixed signal.

2. An information protection method as defined in claim 1, including the further steps of:

collecting and storing the customers' information-input patterns based on the customers' information-input signals received from the telephone;

generating respective colored signals similar to the customers' information-input signals based on the customers' information-input patterns; and storing the colored signals.

3. An information protection method as defined in claim 2, including the further steps of determining the customers' respective mean information-input patterns by analyzing the information-input pattern data, and generating and storing the customers' respective colored signals based on the mean information-input patterns.

4. An information protection method as defined in claim 1, wherein the personal information includes citizen's registered number, bank account number, credit card number, various identification numbers, bank account secret number, on-line banking secret number, security card secret number, OTP, and registered electronic key.

5. An information protection method as defined in claim 1, wherein the step of extracting the customer's information signal is achieved by echo cancellation.

6. An information protection method as defined in claim 3, wherein the mean information-input patterns include tone duration indicating the time taken for a customer's pushing a telephone keypad button, pause-between-tone indicating the interval between successive pushes of buttons, or the strength of a received signal.

* * * * *